W. B. FARRIS.
APPARATUS FOR HANDLING CARCASSES.
APPLICATION FILED MAY 29, 1908.
931,744.
Patented Aug. 24, 1909.
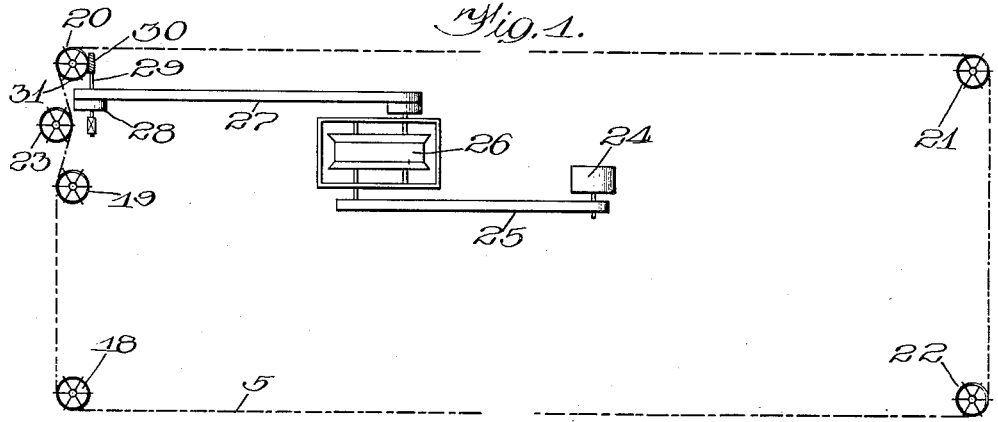
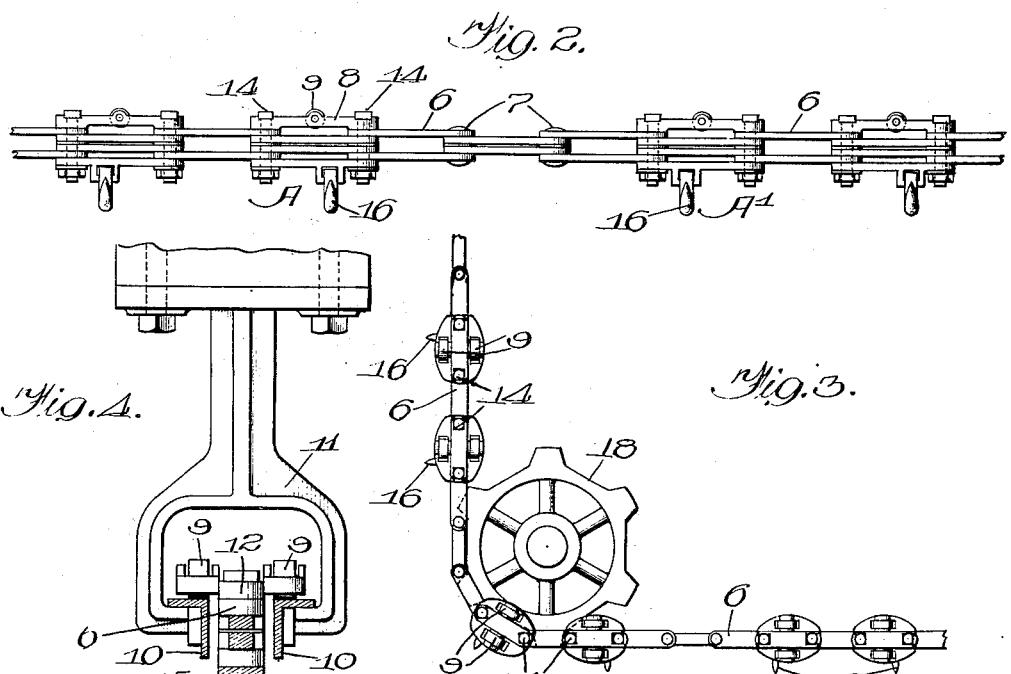

UNITED STATES PATENT OFFICE.

WILLIAM B. FARRIS, OF CHICAGO, ILLINOIS, ASSIGNOR TO MORRIS AND COMPANY, OF CHICAGO, ILLINOIS, A CORPORATION OF NEW JERSEY.

APPARATUS FOR HANDLING CARCASSES.

931,744.    Specification of Letters Patent.    Patented Aug. 24, 1909.

Application filed May 29, 1908. Serial No. 435,818.

*To all whom it may concern:*

Be it known that I, WILLIAM B. FARRIS, a citizen of the United States, residing at Chicago, in the county of Cook and State of Illinois, have invented certain new and useful Improvements in Apparatus for Handling Carcasses, of which the following is a specification, reference being had to the accompanying drawings.

My invention relates to appliances for handling the carcasses of animals in packing houses and other establishments, and has particularly for its object to provide new and improved apparatus for suspending and conveying the carcasses of sheep and other animals during the several stages of their treatment before they are cut up.

To this end, it consists in the features illustrated in the drawings and hereinafter described.

What I regard as new is set forth in the claims.

In the accompanying drawings,—Figure 1 is a diagrammatic view illustrating my improved apparatus in plan; Fig. 2 is an edge view of the endless chain with the parts connected therewith; Fig. 3 is an enlarged detail, being a plan view of a portion of the apparatus; and Fig. 4 is an enlarged cross sectional view, illustrating the chain, the hangers on which the chain is carried, and one of the hooks which engage the carcass.

As illustrated in the drawings, my improved conveyed is made up of an endless chain 5 having as component parts thereof a series of links 6 connected by pivots 7, and hangers 8 which serve also as connecting links, being connected with adjacent links by pivots 14. The hangers 8 comprise plates 12—13 which correspond in length with the links 6, the plate 12 being placed above one of the links 6 and the plate 13 below the same, the two links 6 and the plates 12 and 13 being connected by a pair of bolts or pivots 14, as best shown in Fig. 2. The plates 18 carry anti-friction rollers 9 at opposite sides thereof, as best shown in Fig. 4, thus forming a wheeled carriage or hanger by which the conveyer as a whole is supported and its movement facilitated. The lower plate 13 is provided with a recess to receive the end of the shank 15 of a suspending hook 16, as best shown in Fig. 4, said hook being secured in place by a set-screw 17. The ends of the shanks 15 are flattened so as to provide an extended bearing between each shank and the lower plate 13 to which it is secured and also to enable the set-screw 17 to engage it more securely. Thus the hooks 16 are rigidly attached to the hangers, but may readily be removed when occasion requires.

It will be noted that, as shown in Figs. 2 and 3, the hangers 8 are placed at intervals along the chain, being arranged in pairs so that the animal may be suspended by attaching its hind legs to a pair of adjacent hooks 16. The conveyer as a whole is supported and runs upon rails 10 preferably formed of angle-iron, as shown in Fig. 4, the rails being spaced apart sufficiently to permit of the passage of the chain. For this purpose they are best supported by depending U-shaped brackets 11 which are secured to the ceiling, or other support.

The chain 5 is mounted to travel in a substantially horizontal plane on sprocket-wheels 18, 19, 20, 21, 22 and 23 and is driven from a suitable source of power, as a motor 24, by a belt 25 operating through a variable transmission 26, belt 27 and pulley 28, and worm-shaft 29 carrying a worm 30 which engages a worm-wheel 31 mounted on the same shaft as the sprocket-wheel 20. Of course the specific driving mechanism may be varied, but the construction shown is that which I prefer.

As shown in Fig. 1, the chain 5 travels around the outer margins of the several sprocket-wheels, except the sprocket-wheel 23 which is placed outside the chain and projects to some extent between the sprocket-wheels 19—20 so as to deflect the chain between said wheels, thus taking up the slack and keeping it taut. By thus making the hangers component parts of the chain or carrier, they are held properly in position and are prevented from becoming displaced so that they move smoothly around the sprocket-wheels, and as the suspending hooks 16 are rigidly secured to the hangers the carcasses are prevented from swinging from side to side and are conveyed much more smoothly and satisfactorily than by the conveyers heretofore employed.

That which I claim as my invention, and desire to secure by Letters Patent, is,—

1. An apparatus for handling carcasses, comprising an endless chain composed of links and hangers pivotally connected together, said hangers forming component parts of the chain, a track on which said chain is supported, and means rigidly connected with the hangers for suspending the carcasses.

2. An apparatus for handling carcasses, comprising an endless chain composed of links and hangers pivotally connected together, said hangers being arranged in pairs and forming component parts of the chain, a track on which said chain is supported, and means rigidly connected with the hangers for suspending the carcasses.

3. An apparatus for handling carcasses, comprising an endless chain composed of links and hangers pivotally connected together, said hangers forming component parts of the chain, a track on which said chain is supported, hooks for suspending the carcasses from the hangers, and means detachably connecting the hooks rigidly with the hangers.

4. An apparatus for handling carcasses, comprising an endless carrier composed of hangers and links pivotally connected together, and means rigidly connected with the hangers for suspending the carcasses therefrom.

5. An apparatus for handling carcasses, comprising an endless carrier composed of hangers linked together, means rigidly connected with the hangers for suspending the carcasses, and rollers carried by said hangers at opposite sides thereof and adapted to run on parallel tracks.

6. An apparatus for handling carcasses, comprising hangers linked together, said hangers being composed of upper and lower members, the upper member having rollers at opposite sides thereof adapted to run on parallel tracks for suspending the hanger, the lower member having a hook rigidly connected therewith for suspending the carcasses.

7. An apparatus for handling carcasses, comprising an endless chain composed of links and hangers pivotally connected together, said hangers being composed of upper and lower members, the upper member having parallel rollers adapted to run on parallel tracks, the lower member being connected with the upper member and extending downward between the tracks, and a hook rigidly connected with the lower member and adapted to engage the carcass.

WILLIAM B. FARRIS.

Witnesses:
FRED L. WEEKS,
BRUCE E. PORTEOUS.